United States Patent
Wei et al.

(10) Patent No.: US 11,057,189 B2
(45) Date of Patent: Jul. 6, 2021

(54) PROVIDING DATA AUTHORIZATION BASED ON BLOCKCHAIN

(71) Applicant: Advanced New Technologies Co., Ltd., Grand Cayman (KY)

(72) Inventors: Changzheng Wei, Hangzhou (CN); Ying Yan, Hangzhou (CN); Hui Zhang, Hangzhou (CN); Yujun Peng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,228

(22) Filed: Jan. 31, 2020

(65) Prior Publication Data

US 2020/0169388 A1 May 28, 2020

Related U.S. Application Data

(63) Continuation of application No. PCT/CN2020/072038, filed on Jan. 14, 2020.

(30) Foreign Application Priority Data

Jul. 31, 2019 (CN) .......................... 201910704682.7

(51) Int. Cl.
*H04L 9/06* (2006.01)
*H04L 9/32* (2006.01)
(Continued)

(52) U.S. Cl.
CPC ........... *H04L 9/0637* (2013.01); *G06Q 20/02* (2013.01); *G06Q 20/0658* (2013.01); *H04L 9/321* (2013.01); *H04L 9/3247* (2013.01)

(58) Field of Classification Search
CPC ..... H04L 9/0637; H04L 9/321; H04L 9/3247; G06Q 20/02; G06Q 20/0658
See application file for complete search history.

(56) References Cited

U.S. PATENT DOCUMENTS 6,947,556 B1 9/2005 Matyas, Jr. et al.
9,674,223 B1 * 6/2017 Yu ........................... H04L 67/00
(Continued)

FOREIGN PATENT DOCUMENTS

CN 103034813 4/2013
CN 103765452 4/2014
(Continued)

OTHER PUBLICATIONS

Google Translation of CN107942718 (Year: 2018).*
(Continued)

*Primary Examiner* — Luu T Pham
*Assistant Examiner* — James J Wilcox
(74) *Attorney, Agent, or Firm* — Fish & Richardson P.C.

(57) ABSTRACT

Disclosed herein are methods, systems, and apparatus, including computer programs encoded on computer storage media, for providing blockchain-based data authorization. One of the methods includes receiving, by a blockchain node, a data acquisition transaction submitted by a data user for obtaining target data possessed by a data owner, determining, by the blockchain node, that the data user has obtained authorization of the target data, and executing, by the blockchain node, a smart contract invoked by the data acquisition transaction to provide one or more of the target data and a computational result of one or more predetermined computational operations performed based on the target data to the data user.

16 Claims, 6 Drawing Sheets

(51) Int. Cl.
  *G06Q 20/02* (2012.01)
  *G06Q 20/06* (2012.01)

(56) References Cited

U.S. PATENT DOCUMENTS

| | | | |
|---|---|---|---|
| 9,838,203 | B1 | 12/2017 | Kisley et al. |
| 10,248,783 | B2* | 4/2019 | Costa Faidella ...... H04L 9/3234 |
| 2005/0223412 | A1 | 10/2005 | Nadalin et al. |
| 2006/0064464 | A1 | 3/2006 | Kakivaya et al. |
| 2014/0359348 | A1 | 12/2014 | Volvovski et al. |
| 2015/0172283 | A1 | 6/2015 | Omnes et al. |
| 2015/0193263 | A1* | 7/2015 | Nayyar ................. G06Q 10/06 707/703 |
| 2015/0228018 | A1 | 8/2015 | Richman |
| 2015/0381575 | A1 | 12/2015 | Bhargav-Spantzel et al. |
| 2017/0081796 | A1 | 3/2017 | Belveal |
| 2017/0155515 | A1* | 6/2017 | Androulaki ............. H04L 9/008 |
| 2017/0169250 | A1 | 6/2017 | White |
| 2017/0221029 | A1 | 8/2017 | Lund |
| 2017/0300627 | A1 | 10/2017 | Giordano |
| 2018/0060496 | A1 | 3/2018 | Bulleit |
| 2018/0081529 | A1* | 3/2018 | Zhang .................... H04L 51/12 |
| 2018/0152442 | A1 | 5/2018 | Buldas et al. |
| 2018/0183809 | A1* | 6/2018 | Vadura ................ H04L 63/0815 |
| 2018/0204213 | A1 | 7/2018 | Zappier et al. |
| 2018/0227119 | A1* | 8/2018 | Bibera .................. H04L 9/0643 |
| 2018/0239897 | A1* | 8/2018 | Ventura .................. G06F 21/53 |
| 2018/0240085 | A1* | 8/2018 | Balachov ............. G06Q 20/065 |
| 2018/0276626 | A1 | 9/2018 | Laiben |
| 2018/0293556 | A1 | 10/2018 | Hyun et al. |
| 2018/0309567 | A1* | 10/2018 | Wooden ................ H04L 9/3239 |
| 2018/0314809 | A1* | 11/2018 | Mintz .................... G06F 21/105 |
| 2019/0028277 | A1 | 1/2019 | Jayachandran et al. |
| 2019/0080392 | A1* | 3/2019 | Youb ...................... G06Q 40/00 |
| 2019/0081796 | A1 | 3/2019 | Chow et al. |
| 2019/0116038 | A1* | 4/2019 | Sprague ................ H04L 9/3234 |
| 2019/0179801 | A1* | 6/2019 | Jang .................... G06F 16/1865 |
| 2019/0205563 | A1 | 7/2019 | Gonzales, Jr. |
| 2019/0207750 | A1* | 7/2019 | Harvey ................. H04L 9/0637 |
| 2019/0207751 | A1* | 7/2019 | Harvey ................. H04L 67/104 |
| 2019/0229921 | A1 | 7/2019 | Pulsifer |
| 2019/0251552 | A1* | 8/2019 | Kurian ................. H04L 63/0861 |
| 2019/0268139 | A1* | 8/2019 | Kurian ................. H04L 9/3239 |
| 2019/0294817 | A1 | 9/2019 | Hennebert et al. |
| 2019/0294822 | A1* | 9/2019 | Hennebert ............ H04L 9/3213 |
| 2019/0295202 | A1 | 9/2019 | Mankovskii |
| 2019/0334700 | A1 | 10/2019 | Callan et al. |
| 2019/0340352 | A1* | 11/2019 | Peeters .................. G06F 21/64 |
| 2019/0342077 | A1 | 11/2019 | McMurdie et al. |
| 2019/0354693 | A1* | 11/2019 | Yoon .................... G06F 21/6245 |
| 2019/0358515 | A1 | 11/2019 | Tran |
| 2019/0362352 | A1* | 11/2019 | Kumawat ............ G06Q 20/405 |
| 2019/0394179 | A1 | 12/2019 | Androulaki et al. |
| 2020/0004737 | A1* | 1/2020 | Qiu ....................... H04L 9/3247 |
| 2020/0005296 | A1* | 1/2020 | Green .................... H04L 9/3228 |
| 2020/0013046 | A1* | 1/2020 | Joao ..................... G06Q 20/227 |
| 2020/0021439 | A1* | 1/2020 | Sato ..................... G06Q 20/401 |
| 2020/0026834 | A1* | 1/2020 | Vimadalal ............. G06F 16/182 |
| 2020/0027169 | A1* | 1/2020 | Valencia ............... H04L 9/3239 |
| 2020/0034457 | A1 | 1/2020 | Brody et al. |
| 2020/0036519 | A1 | 1/2020 | Bitauld et al. |
| 2020/0067907 | A1 | 2/2020 | Avetisov et al. |
| 2020/0074518 | A1* | 3/2020 | Kumaraswamy ..... H04L 9/3239 |
| 2020/0082933 | A1* | 3/2020 | Lu ......................... G16H 10/60 |
| 2020/0084097 | A1* | 3/2020 | Marks ................ G06Q 20/38215 |
| 2020/0118110 | A1 | 4/2020 | Coverstone |
| 2020/0118131 | A1* | 4/2020 | Diriye ................... G06F 16/2379 |
| 2020/0119905 | A1* | 4/2020 | Revankar ............. G06Q 20/06 |
| 2020/0145229 | A1* | 5/2020 | Li ............................ H04L 9/30 |
| 2020/0219093 | A1* | 7/2020 | Malhotra ............. H04L 67/06 |
| 2020/0226285 | A1* | 7/2020 | Bulleit .................. G06F 21/33 |
| 2020/0227160 | A1* | 7/2020 | Youngblood .......... G16H 20/70 |
| 2020/0272619 | A1* | 8/2020 | Alferov ................ G06Q 50/265 |
| 2020/0280443 | A1* | 9/2020 | Simons ................ H04L 63/12 |
| 2020/0287874 | A1* | 9/2020 | Bertram ................ H04L 9/3234 |
| 2020/0302429 | A1* | 9/2020 | Anton ................... H04L 9/3255 |
| 2020/0304474 | A1 | 9/2020 | Kisko |
| 2020/0311052 | A1* | 10/2020 | Takahashi ........... G06F 16/2365 |

FOREIGN PATENT DOCUMENTS

| | | | |
|---|---|---|---|
| CN | 108235772 | | 6/2016 |
| CN | 106600405 | | 4/2017 |
| CN | 107391944 | | 11/2017 |
| CN | 107453865 | | 12/2017 |
| CN | 107483211 | A * | 12/2017 ........... H04L 9/0643 |
| CN | 108985089 | | 2/2018 |
| CN | 107942718 | A * | 4/2018 ........... H04L 9/0643 |
| CN | 108234515 | | 6/2018 |
| CN | 108632268 | | 10/2018 |
| CN | 108681898 | | 10/2018 |
| CN | 108881160 | | 11/2018 |
| CN | 108932297 | | 12/2018 |
| CN | 109033846 | | 12/2018 |
| CN | 109034833 | | 12/2018 |
| CN | 109067791 | | 12/2018 |
| CN | 109190410 | | 1/2019 |
| CN | 109214197 | | 1/2019 |
| CN | 109274640 | | 1/2019 |
| CN | 109344647 | | 2/2019 |
| CN | 109347941 | | 2/2019 |
| CN | 109450910 | | 3/2019 |
| CN | 109635585 | | 4/2019 |
| CN | 109636503 | | 4/2019 |
| CN | 109639643 | | 4/2019 |
| CN | 109949155 | | 6/2019 |
| CN | 109977697 | | 7/2019 |
| CN | 110011996 | | 7/2019 |
| CN | 110032865 | | 7/2019 |
| CN | 110060162 | | 7/2019 |
| CN | 110457875 | | 11/2019 |
| CN | 110473094 | | 11/2019 |
| CN | 110473096 | | 11/2019 |
| EP | 3547203 | | 2/2019 |
| TW | 201724825 | | 7/2017 |
| TW | 201730825 | | 9/2017 |
| TW | 201730829 | | 9/2017 |
| TW | 201732666 | | 9/2017 |
| TW | 201732700 | | 9/2017 |
| TW | 201812674 | | 4/2018 |
| TW | M561279 | | 6/2018 |
| TW | 201824108 | | 7/2018 |
| TW | 201828200 | | 8/2018 |
| TW | 201842476 | | 12/2018 |
| TW | 201909002 | | 3/2019 |
| TW | 201909084 | | 3/2019 |
| TW | 201914254 | | 4/2019 |
| WO | WO 2019078879 | | 4/2019 |

OTHER PUBLICATIONS

Google Translation of CN107483211 (Year: 2017).*
Khezr et al, "Blockchain Technology in Healthcare: A Comprehensive Review and Directions for Future Research," Dec. 5, 2019, pp. 1-28 (Year: 2019).*
Jesus et al, "A Survey of How to Use Blockchain to Secure Internet of Things and the Stalker Attack," Aug. 20, 2018, pp. 1-28 (Year: 2018).*
Jin et al, "Bspace: a Group Workspace over the Ethereum Blockchain with Off-Blockchain Storage," Jun. 23, 2019, pp. 53-60 (Year: 2019).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in International Application No. PCT/CN2020/072038, dated Apr. 26 26, 2020, 19 pages (with Machine Translation).
International Search Report and Written Opinion in International Application No. PCT/CN2020/072153, dated May 8, 2020, 18 pages (with Machine Translation).

(56) References Cited

OTHER PUBLICATIONS

International Search Report and Written Opinion in International Application No. PCT/CN2020/072224, dated Apr. 24, 2020, 25 pages (with Machine Translation).

* cited by examiner

PROVIDING DATA AUTHORIZATION BASED ON BLOCKCHAIN

CROSS-REFERENCE TO RELATED APPLICATIONS

This application is a continuation of PCT Application No. PCT/CN2020/072038, filed on Jan. 14, 2020, which claims priority to Chinese Patent Application No. 201910704682.7, filed on Jul. 31, 2019, and each application is hereby incorporated by reference in its entirety.

TECHNICAL FIELD

One or more implementations of the present specification relate to the field of blockchain technologies, and in particular, to a smart contract-based data authorization method and apparatus.

BACKGROUND

A blockchain technology (also referred to as a distributed ledger technology) is a decentralized distributed database technology, and is characterized by decentralization, openness and transparency, tamper-resistance, trustworthiness, etc., and therefore, is applicable to many application scenarios that require high data reliability.

SUMMARY

In view of this, one or more implementations of the present specification provide a smart contract-based data authorization method and apparatus.

To achieve the previous objective, one or more implementations of the present specification provide the following technical solutions:

According to a first aspect of one or more implementations of the present specification, a smart contract-based data authorization method is provided, and includes the following: receiving, by a blockchain node, a data acquisition transaction submitted by a data user, where the data acquisition transaction is used to request to obtain target data held by a data owner; and executing, by the blockchain node, a data authorization smart contract invoked to perform the data acquisition transaction, where the data authorization smart contract is used to obtain the target data when it is confirmed that the data user is authorized, so that the data user obtains at least one of the target data and an operation result obtained after a predetermined operation is performed on the target data.

According to a second aspect of one or more implementations of the present specification, a smart contract-based data authorization apparatus is provided, and includes the following: a receiving unit, configured to enable a blockchain node to receive a data acquisition transaction submitted by a data user, where the data acquisition transaction is used to request to obtain target data held by a data owner; and an execution unit, configured to enable the blockchain node to execute a data authorization smart contract invoked to perform the data acquisition transaction, where the data authorization smart contract is used to obtain the target data when it is confirmed that the data user is authorized, so that the data user obtains at least one of the target data and an operation result obtained after a predetermined operation is performed on the target data.

According to a third aspect of one or more implementations of the present specification, an electronic device is provided, and includes the following: a processor; and a memory, configured to store an instruction that can be executed by the processor, where the processor runs the executable instruction to implement the method according to the first aspect.

According to a fourth aspect of one or more implementations of the present specification, a computer-readable storage medium is provided, where the computer-readable storage medium stores a computer instruction, and when the instruction is executed by a processor, the steps in the method according to the first aspect are implemented.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method can include more or less steps than those described in the present specification. In addition, an individual step described in the present specification can be divided into a plurality of steps in other implementations for description. However, a plurality of steps described in the present specification can also be combined into a single step for description in other implementations.

Figure 1:
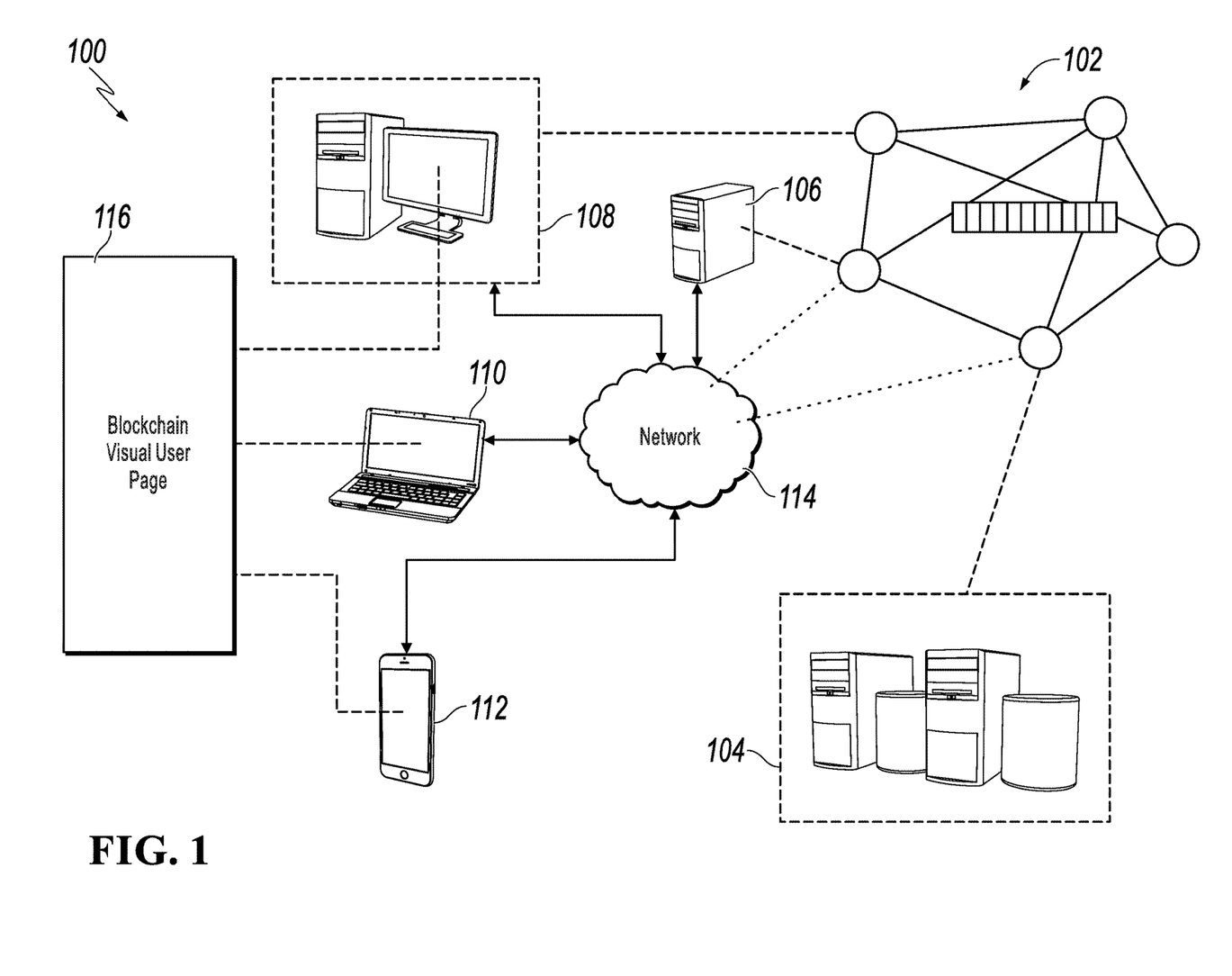
FIG. 1 is a schematic diagram illustrating an example environment, according to an example implementation.

FIG. 1 is a schematic diagram illustrating an example environment, according to an example implementation. As shown in FIG. 1, an entity is allowed to participate in a blockchain network 102 in an example environment 100. The blockchain network 102 can be a public blockchain network, a private blockchain network, or a consortium blockchain network. The example environment 100 can include computing devices 104, 106, 108, 110, and 112, and a network 114. In an implementation, the network 114 can include a local area network (LAN), a wide area network (WAN), the Internet, or a combination of LAN, WAN and Internet, and is connected to a website, user equipment (e.g., a computing device), and a backend system. In an implementation, the network 114 can be accessed through at least one of wired communication or wireless communication.

In some situations, the computing devices 106 and 108 can be nodes (not shown) in a cloud computing system, or each of the computing devices 106 and 108 can be a standalone cloud computing system, including a plurality of computers interconnected through a network and operating as a distributed processing system.

In an implementation, the computing devices 104 to 108 can run any suitable computing system, so as to serve as nodes in the blockchain network 102. For example, the computing devices 104 to 108 can include but are not limited to a server, a desktop computer, a notebook computer, a tablet, and a smartphone. In an implementation, the computing devices 104 to 108 can belong to a related entity and are configured to implement a corresponding service. For example, the service can be used to manage a transaction of one entity or a transaction between a plurality of entities.

In an implementation, each of the computing devices 104 to 108 stores a blockchain ledger corresponding to the blockchain network 102. The computing device 104 can be (or include) a network server configured to provide a browser function, and the network server can provide visual information related to the blockchain network 102 based on the network 114. In some situations, the computing device 104 may not participate in block verification, but monitor the blockchain network 102 to determine when other nodes (e.g., the computing devices 106 and 108) reach a consensus, and therefore, generate a corresponding blockchain visual user page if other nodes reach a consensus.

In an implementation, the computing device 104 can receive a request from a client device (e.g., the computing device 110 or the computing device 112) for the blockchain visual user page. In some situations, a node in the blockchain network 102 can also serve as a client device. For example, a user of the computing device 108 can send the request to the computing device 104 by using a browser running on the computing device 108.

In response to the request, the computing device 104 can generate the blockchain visual user page (e.g., a webpage) based on the stored blockchain ledger, and send the blockchain visual user page generated to the requesting client device. If the blockchain network 102 is a private blockchain network or a consortium blockchain network, the request for the blockchain visual user page can include user authorization information. Before generating the blockchain visual user page and sending the blockchain visual user page to the requesting client device, the computing device 104 can perform verification on the user authorization information, and return the corresponding blockchain visual user page after the verification succeeds.

The blockchain visual user page can be displayed on the client device (e.g., a user interface 116 shown in FIG. 1). When the blockchain ledger is updated, display content on the user interface 116 can be updated accordingly. In addition, interaction between the user and the user interface 116 can result in a request for another user interface, for example, displaying a block list, block details, a transaction list, transaction details, an account list, account details, a contract list, contract details, or a search result page generated after the user searches the blockchain network.

Figure 2:
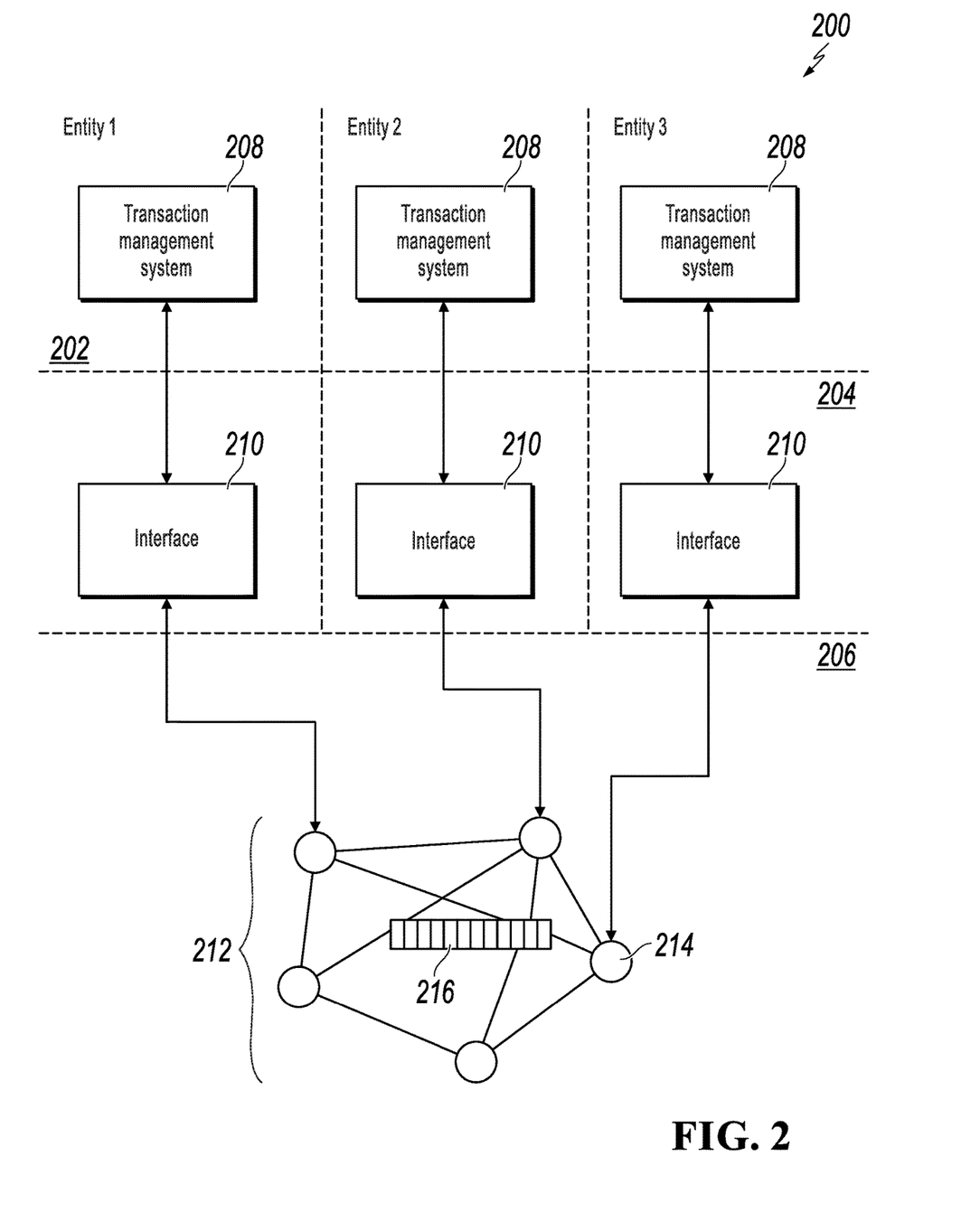
FIG. 2 is a schematic diagram illustrating a concept framework, according to an example implementation.

FIG. 2 is a schematic diagram illustrating a concept framework, according to an example implementation. As shown in FIG. 2, the concept framework 200 includes an entity layer 202, a hosting service layer 204, and a blockchain network layer 206. For example, the entity layer 202 can include three entities: an entity 1, an entity 2, and an entity 3, and each entity has its own transaction management system 208.

In an implementation, the hosting service layer 204 can include an interface 210 corresponding to each transaction management system 208. For example, each transaction management system 208 communicates with the corresponding interface 210 over a network (e.g., the network 114 in FIG. 1) using a protocol (e.g., Hypertext Transfer Protocol Secure (HTTPS)). In some examples, each interface 210 can provide a communication connection between a transaction management system 208 corresponding to each interface and the blockchain network layer 206. More specifically, the interface 210 can communicate with a blockchain network 212 of the blockchain network layer 206. In some examples, communication between the interface 210 and the blockchain network layer 206 can be implemented through remote procedure calls (RPCs). In some examples, the interface 210 can provide an API interface to the transaction management system 208 for accessing the blockchain network 212.

As described here, the blockchain network 212 is provided in the form of an equalized network including a plurality of nodes 214. Each of the nodes 214 is respectively configured to permanently store a blockchain ledger 216 formed by blockchain data. FIG. 2 shows only one blockchain ledger 216, but a plurality of blockchain ledgers 216 or copies thereof can exist in the blockchain network 212. For example, each node 214 can maintain one blockchain ledger 216 or a copy thereof.

It is worthwhile to note that a transaction described in the present specification refers to data that is created by a user by using a client of a blockchain network and needs to be finally published to a distributed database of the blockchain network. Transactions in the blockchain include a transaction in a narrow sense and a transaction in a broad sense. The transaction in the narrow sense refers to a value transfer published by a user in the blockchain. For example, in a conventional bitcoin blockchain network, the transaction can be a transfer initiated by the user in the blockchain. The transaction in the broad sense refers to service data with a service intention that is published by a user in the blockchain. For example, an operator can create a consortium blockchain based on an actual service need, and deploy some other types of online services (e.g., a rental service, a vehicle scheduling service, an insurance claim service, a credit service, and a medical service) that are not related to a value transfer in the consortium blockchain. In such a consortium blockchain, the transaction can be a service message or a service request with a service intention that is published by a user in the consortium blockchain.

Generally, there are three types of blockchains: a public blockchain, a private blockchain, and a consortium blockchain. In addition, there is a combination of a plurality of types, for example, a private blockchain+a consortium blockchain, or a consortium blockchain+a public blockchain. The public blockchain has the highest degree of decentralization. A bitcoin blockchain and an Ethereum blockchain are representatives of the public blockchain. Participants of the public blockchain can read data records in the blockchain, participate in transactions, compete for accounting rights of new blocks, etc. Furthermore, each participant (i.e., node) can freely join and exit the network and perform related operations. On the contrary, writing permission of the private blockchain network is controlled by a certain organization or agency, and data reading permission is specified by the organization. Briefly, the private blockchain network can be a weakly centralized system, a strict restriction is imposed on participating nodes, and there are a few participating nodes. This type of blockchain is more suitable for use within a specified organization. The consortium blockchain is a blockchain between the public blockchain and the private blockchain, and can implement "partial decentralization". Each node in the consortium blockchain network usually has a corresponding organization. Participants join the network through authorization and form an interest-related consortium to jointly maintain operations of the blockchain network.

The public blockchain network, the private blockchain network, and the consortium blockchain network can provide a function of a smart contract. A smart contract in a blockchain network is a contract that can be triggered by a transaction in the blockchain system. The smart contract can be defined in a form of code.

Taking Ethereum as an example, a user can create and invoke some complex logic in the Ethereum network, which is the biggest challenge of Ethereum different from the bitcoin blockchain technology. As a programmable blockchain, the core of Ethereum is an Ethereum virtual machine (EVM), and each Ethereum node can run the EVM. The EVM is a Turing-complete virtual machine, through which various types of complex logic can be implemented. The smart contract published or invoked by a user in Ethereum can be run by the EVM.

However, in the technical solutions of the present specification, a smart contract is published and invoked on a blockchain node, so that secure end-to-end data authorization can be implemented between a data owner and a data user. The following describes the technical solutions of the present specification with reference to implementations.

Figure 3:
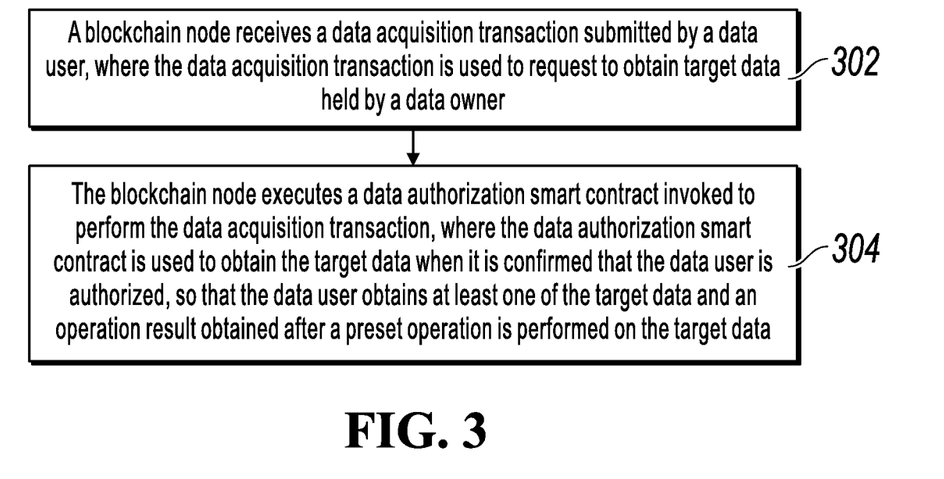
FIG. 3 is a flowchart illustrating a smart contract-based data authorization method, according to an example implementation.

FIG. 3 is a flowchart illustrating a smart contract-based data authorization method, according to an example implementation. As shown in FIG. 3, the method is applied to a blockchain node and can include the following steps:

Step 302: A blockchain node receives a data acquisition transaction submitted by a data user, where the data acquisition transaction is used to request to obtain target data held by a data owner.

The data user can directly generate the data acquisition transaction on the blockchain node. Or, the data user can generate the data acquisition transaction on a client, and send the data acquisition transaction to the blockchain node by using the client. Or, after generating the data acquisition transaction on a client, the data user can send the data acquisition transaction to another blockchain node, and the another blockchain node sends the data acquisition transaction to the blockchain node. Certainly, after a consensus on the data acquisition transaction is reached, the data acquisition transaction is transmitted to each blockchain node in the blockchain network, and each blockchain node executes the data acquisition transaction.

Generally, in a blockchain network using consensus algorithms such as proof of work (POW), proof of stake (POS), and delegated proof of stake (DPOS), nodes that compete for an accounting right can execute a blockchain transaction after receiving the blockchain transaction. One of the nodes that compete for the accounting rights may win in the current round, and becomes an accounting node. Using the previous data acquisition transaction as an example, the accounting node can pack the data acquisition transaction with other transactions to generate a new block, and send the new block generated to other nodes for consensus.

In a blockchain network using mechanisms such as practical *Byzantine* fault tolerance (PBFT), a node with accounting rights can be predetermined before the current round of accounting. Therefore, after receiving the data acquisition transaction, the blockchain node can send the data acquisition transaction to the accounting node if the blockchain node itself is not the accounting node of the current round. The accounting node of the current round (which can be the previous blockchain node) can execute the data acquisition transaction when or before packing the data acquisition transaction to generate a new block or when or before packing the data acquisition transaction with other transactions to generate a new block. The accounting node packs the data acquisition transaction (or packs the data acquisition transaction with other transactions) to generate a new block, and then sends the new block generated or a block header to other nodes for consensus.

As described above, in the blockchain network using the POW mechanism or in the blockchain network using POS, DPOS, and PBFT mechanisms, the accounting node of the current round can pack the data acquisition transaction to generate a new block, and send the new block generated or a block header to other nodes for consensus. If the other nodes verify that there is no problem after receiving the block, the new block can be appended to the end of an original blockchain, so that the accounting process is completed and a consensus is reached. If the data acquisition transaction is used to invoke a data authorization smart contract, invocation and execution of the data authorization smart contract are completed. When performing verification on a new block or a block header sent by the accounting node, another node can also execute a data acquisition transaction in the block.

Step 304: The blockchain node executes a data authorization smart contract invoked to perform the data acquisition transaction, where the data authorization smart contract is used to obtain the target data when it is confirmed that the data user is authorized, so that the data user obtains at least one of the target data and an operation result obtained after a predetermined operation is performed on the target data.

After the data authorization smart contract is created, a corresponding contract account is formed in the blockchain, and the contract account has a specified contract address. For example, the data acquisition transaction can include the contract address in a TO field of the data acquisition transaction to invoke the data authorization smart contract. As described above, after blockchain nodes in the blockchain network reach a consensus, each node receives the data acquisition transaction, reads the TO field of the data acquisition transaction, and invokes the data authorization smart contract, which specifically means reading code of the data authorization smart contract into an EVM of the blockchain node for execution.

The data acquisition transaction can include information about the target data, for example, a hash value or any other description information of the target data, provided that the information can relate to the target data. For example, the information about the target data can be included in a DATA field of the data acquisition transaction. When the data acquisition transaction invokes the data authorization smart contract, content in the DATA field can be used as input information of the data authorization smart contract.

The data authorization smart contract can include a corresponding list of authorized parties for recording information about authorized objects of data held by the data owner, namely, information about the authorized parties. In this case, if the data authorization smart contract confirms that the data user is in the list of authorized parties, it can be confirmed that the data user is authorized. In a management method of the list of authorized parties, one-time authorization can be performed on all data held by the data owner, and content of the list of authorized parties is not affected even when the data held by the data owner increases or decreases, in other words, an update to the data held by the data owner can be compatible.

When the data authorization smart contract is being created, information about the list of authorized parties can be written into contract code, so that content of the list of authorized parties cannot be changed. In this case, the data authorization smart contract may need to be replaced or a version thereof may need to be updated, to update the list of authorized parties. Or, the data authorization smart contract can have one or more corresponding states, and the blockchain node can maintain values of the one or more states. When a state value is information about an authorized party, the one or more states are equivalent to the list of authorized parties. The data owner can submit a blockchain transaction in the blockchain network, and the blockchain transaction can invoke an authorization interface defined in the data authorization smart contract, so that content of the list of authorized parties can be updated after the data authorization smart contract is executed, without a need to replace the data authorization smart contract or update a version thereof. Or, the data authorization smart contract can invoke another smart contract, and code or a state of the another smart contract can be used to record the list of authorized parties. If the list of authorized parties is immutably written into the code of the another smart contract, when the list of authorized parties needs to be updated, a new smart contract can be created, where code of the new smart contract includes an updated list of authorized parties, and then the data authorization smart contract invokes a contract address of the new smart contract (the invoked contract address can be used as a state of the data authorization smart contract, and a value of the state can change). If the list of authorized parties is written into the state corresponding to the another smart contract, as described above, only a value of the state needs to be updated, to update the list of authorized parties, without a need to update the contract address invoked by the data authorization smart contract. The contract address can be permanently written into code of the data authorization smart contract, or can be written into a state of the data authorization smart contract.

The data user can temporarily request authorization from the data owner. For example, the data user can submit an authorization request transaction to the blockchain network, and the authorization request transaction invokes a request interface defined in the data authorization smart contract. As such, after executing the authorization request transaction, the blockchain node can invoke the request interface defined in the data authorization smart contract, so that the data authorization smart contract writes an authorization request event into a transaction log. Then, through an event monitoring responding mechanism, the data owner can respond to the authorization request event written into the transaction log. For example, when it is determined that the data user can be authorized, the data owner can submit an authorization confirmation transaction to the blockchain network, and the authorization confirmation transaction invokes an authorization interface defined in the data authorization smart contract. As such, after executing the authorization confirmation transaction, the blockchain node can invoke the authorization interface defined in the data authorization smart contract, so that the data authorization smart contract marks the data user as authorized. In one situation where the data user is marked as authorized, the data user can be added to the list of authorized parties. A process of adding the data user to the list of authorized parties is described above, and details are omitted here for simplicity. Provided that the data user is in the list of authorized parties, the data user can request to obtain the data held by the data owner at any time, in other words, the data user is authorized in the long term. In the other situation, the data authorization smart contract only confirms that the data user is authorized for a current operation, and the data authorization smart contract can respond to a data acquisition request of the data user this time. However, after a current data acquisition transaction is completed, the data user is unauthorized, and the data user needs to request authorization from the data owner again.

Although the list of authorized parties belongs to long-term authorization compared with the latter situation, the list of authorized parties doesn't necessarily mean permanent authorization. For example, the data owner can update the list of authorized parties to remove one or more authorized parties, so that the one or more authorized parties are unauthorized. For another example, each authorized party in the list of authorized parties can have a certain quantity of remaining authorization duration and/or the quantity of remaining authorizations. When the remaining authorization duration or the quantity of remaining authorizations is reset to 0, a corresponding authorized party can be automatically removed from the list of authorized parties, which is equivalent to an "aging" mechanism implemented on an authorized party in the list of authorized parties.

The data user can include the information about the target data in the authorization request transaction, and the information about the target data can be written into the authorization request event in the transaction log, so that the data owner learns an authorization range requested by the data user. If the authorization request transaction does not include any data information, authorization for all data held by the data owner is requested by the data user. Accordingly, the data owner can add the information about the target data to the authorization confirmation transaction to indicate that the data user is authorized for the target data. If the authorization confirmation transaction submitted by the data owner does not include any data information, the data owner authorizes the data user for all data. Therefore, in some situations, the information about the target data included in the data acquisition transaction of the data user can be inconsistent with an authorization range (i.e., data that the data user is authorized) obtained by the data user. In this case, the data acquisition transaction may not be normally executed or the data authorization smart contract cannot successfully obtain the target data specified in the data acquisition transaction.

After the data authorization smart contract obtains the target data, the target data can be directly provided to the data user. For example, the data authorization smart contract can write the target data into the transaction log of the data acquisition transaction, so that the data user can obtain the target data by monitoring the transaction log. The blockchain node can encrypt the target data, so that encrypted target data is written into the transaction log. In this case, a data user holding a key can read and decrypt the encrypted target data to obtain the target data, and an unrelated user cannot decrypt the encrypted target data. Therefore, it can be ensured that the data user obtains the target data, and the situation that target data is written into the transaction log in plaintext and obtained by an unrelated person can be avoided. As such, leakage of the target data is alleviated, and interests of the data owner are protected.

After obtaining the target data, the data authorization smart contract can perform the predetermined operation on the target data, and provide the operation result to the data user. The predetermined operation can be any operation desired by the data user, and is not limited in the present specification. For example, an operation rule of the predetermined operation can be predefined in the data authorization smart contract. One or more operation rules can be defined in the data authorization smart contract. Especially, when there are a plurality of operation rules, the data user can specify a needed operation rule in the data acquisition transaction (e.g., the data user adds an identifier corresponding to the operation rule to the DATA field of the data acquisition transaction). For another example, an operation rule of the predetermined operation can be transferred into the data authorization smart contract by the data acquisition transaction. For example, the operation rule of the predetermined operation can be written into the DATA field of the data acquisition transaction, and then transferred into the data authorization smart contract. When the corresponding operation result is obtained after the predetermined operation is performed on the target data, if the data user cannot inversely deduce a value of the target data from the operation result, the data user can be prevented from directly obtaining the target data while a data acquisition requirement of the data user is satisfied. As such, the data user can be prevented from leaking the target data and jeopardizing interests of the data owner, ensuring that the target data is always held only by the data owner.

Data held by the data owner can have different privacy levels. Correspondingly, data at different privacy levels can be processed in different ways. For example, the data owner can separately hold data at a relatively low privacy level and data at a relatively high privacy level. Correspondingly, when the target data is at the low privacy level, the target data can be provided to the data user, in other words, the data owner does not care whether the data at the low privacy level is leaked. When the target data is at the high privacy level, a predetermined operation needs to be performed on the target data, so that a corresponding operation result is provided to the data user, ensuring that the data at the high privacy level is not leaked. If the target data includes both data at the low privacy level and data at the high privacy level, the target data at the low privacy level can be directly provided to the data user, the predetermined operation is performed on the target data at the high privacy level, and the operation result is then provided to the data user. Or, especially when the data user has specified a needed operation rule of the predetermined operation in the data acquisition transaction, the predetermined operation can be implemented on all target data, and then the operation result is provided to the data user.

At least one of the target data and the operation result can be written into the transaction log by the data authorization smart contract using an event mechanism. For example, a transaction execution result event is formed in the transaction log, so that the data user can monitor the transaction execution result event to obtain at least one of the target data and the operation result. A rule of the monitoring process is similar to that of monitoring the authorization request event by the data owner. Therefore, details are omitted here for simplicity.

The target data can be stored in a database corresponding to the blockchain node, so that after the data authorization smart contract is executed, the target data can be directly read from the database and provided to the data user. To prevent the target data from being obtained by an unrelated person, the target data can be encrypted, and corresponding encrypted target data is stored in the database, so that the unrelated person can only obtain the encrypted target data at most, thereby alleviating leakage of the target data.

The target data can be encrypted in a trusted execution environment (TEE). Because the target data can be any data requested by the data user and held by the data owner, any data held by the data owner can be encrypted in a similar way. The TEE is a trusted execution environment based on a secure extension of CPU hardware that is isolated from the outside. The TEE was first proposed by the Global Platform to alleviate a problem of resource security isolation on a mobile device, and is parallel to a trusted and secure execution environment provided by an operating system to an application. For example, TEE technologies such as Intel's Software Protection Extensions (SGX) isolate code execution, remote attestation, secure configuration, secure storage of data, and trusted paths for executing code. Security of an application running in the TEE is protected, and the application is almost impossible to be accessed by a third party.

The Intel SGX technology is used as an example. The blockchain node can allocate an enclave page cache (EPC) in a memory by using a processor instruction added to a CPU, load an EVM into the EPC, and confirm, through remote attestation, that code of the loaded EVM is consistent with code of an EVM at a key management server (e.g., comparing hash values). After the remote attestation succeeds, the blockchain node encrypts the target data by using a memory encryption engine (MME) in the CPU, and stores encrypted target data into the EPC. The encrypted content in the EPC can be decrypted to a plaintext only after entering the CPU. In the CPU, the target data in plaintext is encrypted to obtain the encrypted target data, so as to be stored in the database corresponding to the blockchain node. In response to the data acquisition transaction submitted by the data user, the blockchain node can execute the data authorization smart contract in the trusted execution environment, to read the encrypted target data into the trusted execution environment for decryption, and then the data authorization smart contract performs a predetermined operation on the target data. For example, after the remote attestation succeeds, the blockchain node separately encrypts the obtained encrypted target data and the code of the data authorization smart contract by using the MME in the CPU, and stores encrypted target data and encrypted code into the EPC. The encrypted content in the EPC can be decrypted only after entering the CPU. In the CPU, the encrypted target data can be decrypted to the target data in plaintext, and a predetermined operation is performed on the target data by executing the code of the data authorization smart contract. Therefore, encryption and decryption are performed for the target data in the TEE, and the code of the data authorization smart contract is executed, so that a secure and reliable environment can be provided, and interference from external factors is reduced.

The blockchain node can encrypt the target data by using a symmetric encryption key. For example, the key can be sent by the key management server to the blockchain node. For another example, the key can be obtained through negotiation between blockchain nodes. Or, the key can be an asymmetric encryption key. Implementations are not limited in the present specification. The key can be stored in a security enclave created on the blockchain node. For example, the security enclave can be a quoting enclave (QE) instead of an application enclave (AE).

The data owner can store the target data in a blockchain by submitting a private certificate transaction to the blockchain network. Transaction content of the privacy certificate transaction includes the target data in plaintext. However, the transaction content of the privacy certificate transaction can be encrypted by using a key, so that after a block where the privacy certificate transaction is located is added to the blockchain, the target data cannot be obtained by viewing the transaction content of the privacy certificate transaction. Correspondingly, a key can be maintained in the trusted execution environment of the blockchain node, so that the blockchain node can decrypt the privacy certificate transaction in the trusted execution environment after receiving the privacy certificate transaction submitted by the data owner, to obtain the target data included in the transaction content. The data owner can encrypt the transaction content through symmetric encryption or asymmetric encryption. Implementations are not limited in the present specification. The key can be generated through negotiation between the blockchain node and the data owner; or the key can be generated by the key management server and sent to the data owner and the blockchain node.

The data owner can store the target data in a blockchain by submitting a certificate transaction to the blockchain network. Transaction content of the certificate transaction can include at least one of creating and invoking a smart contract, so that after receiving the certificate transaction submitted by the data owner, the blockchain node can execute the corresponding transaction content in the trusted execution environment, for example, executing code of the smart contract that needs to be created, invoked, or created and invoked, to generate the target data. Further, the blockchain node can encrypt the target data and store the encrypted target data in the database. Because the target data appears in plaintext only in the trusted execution environment, and appears in ciphertext in an environment other than the trusted execution environment, there is no need to worry about leakage of the target data in plaintext.

In addition to being stored in the database of the blockchain node, the target data can be stored through a channel off the blockchain by the data owner, and the blockchain node stores only a digital digest of the target data. For example, the digital digest can be a hash value of the target data. In this case, the data authorization smart contract can obtain the target data from the channel off the blockchain by using a cross-chain technology, and provide at least one of the target data and the operation result to the data user. An oracle-based cross-chain technology is used as an example: The data authorization smart contract can invoke an oracle smart contract, so that the oracle smart contract obtains the target data from the channel off the blockchain, and then the data authorization smart contract can write the obtained target data into the transaction log of the data acquisition transaction by using the event mechanism, and/or perform the predetermined operation on the target data and then write the operation result into the transaction log of the data acquisition transaction by using the event mechanism, so that the data user can monitor the transaction log to obtain at least one of the target data and the operation result.

It is worthwhile to note that "data" held by the data owner and requested by the data user in the present specification should be understood as a generalized concept, for example, a value, a character, an image, audio, a video, code, a program, or a model (e.g., an artificial intelligence model). Implementations are not limited in the present specification.

Figure 4:
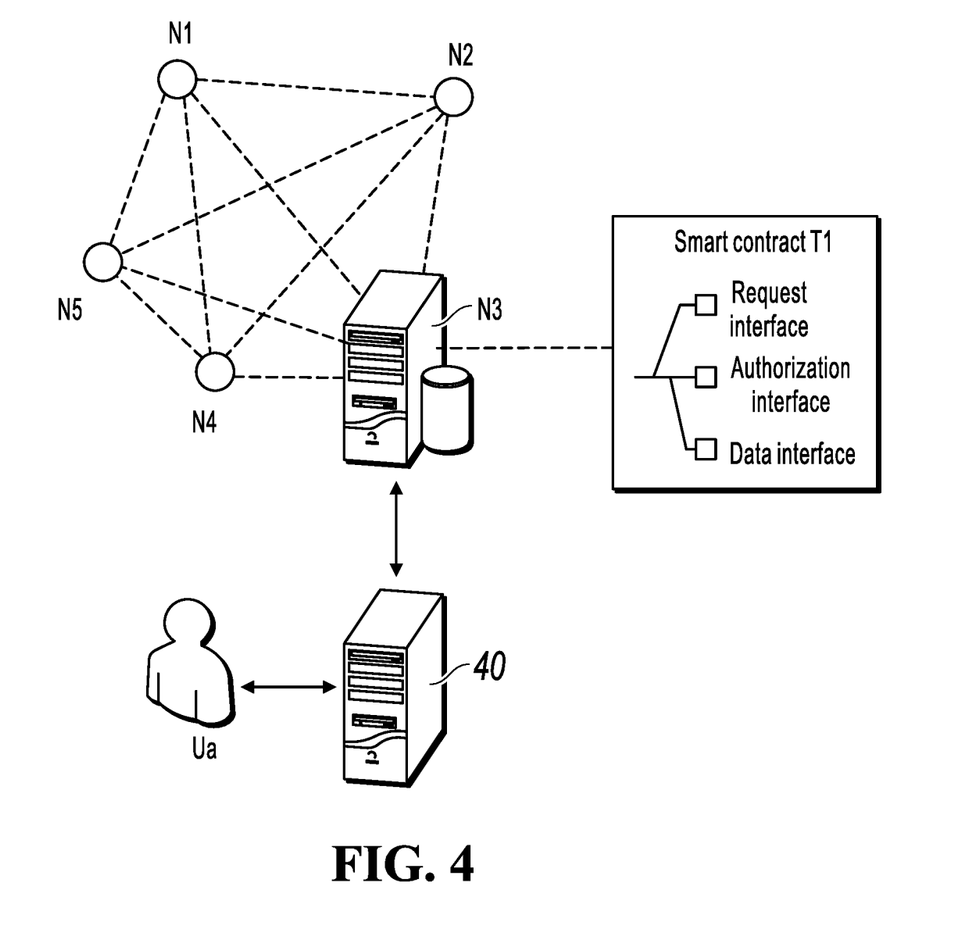
FIG. 4 is a schematic diagram illustrating end-to-end data authorization implemented based on a blockchain network, according to an example implementation.

FIG. 4 is a schematic diagram illustrating end-to-end data authorization implemented based on a blockchain network, according to an example implementation. As shown in FIG. 4, assume that nodes such as N1, N2, N3, N4, and N5 exist in a blockchain network, and the blockchain network can be a consortium blockchain network composed of a service platform and several partners. For example, in a supply chain financial scenario, nodes such as N1, N2, N4, and N5 correspond to several supply chain financial enterprises directly or indirectly, node N3 corresponds to the service platform, and a user can obtain, based on the service platform, target data of each supply chain financial enterprise or an operation result obtained based on the target data. For another example, in an invoice scenario, nodes such as N1, N2, N4, and N5 correspond to several merchants directly or indirectly, node N3 corresponds to the service platform, and a user can obtain, based on the service platform, invoices issued by the merchants, some information in the invoices, or an operation result obtained based on the invoice information. Certainly, the technical solutions of the present specification can be further applied to another scenario. Implementations are not limited in the present specification. For ease of understanding, the following uses the supply chain financial scenario as an example for description.

Figure 5:
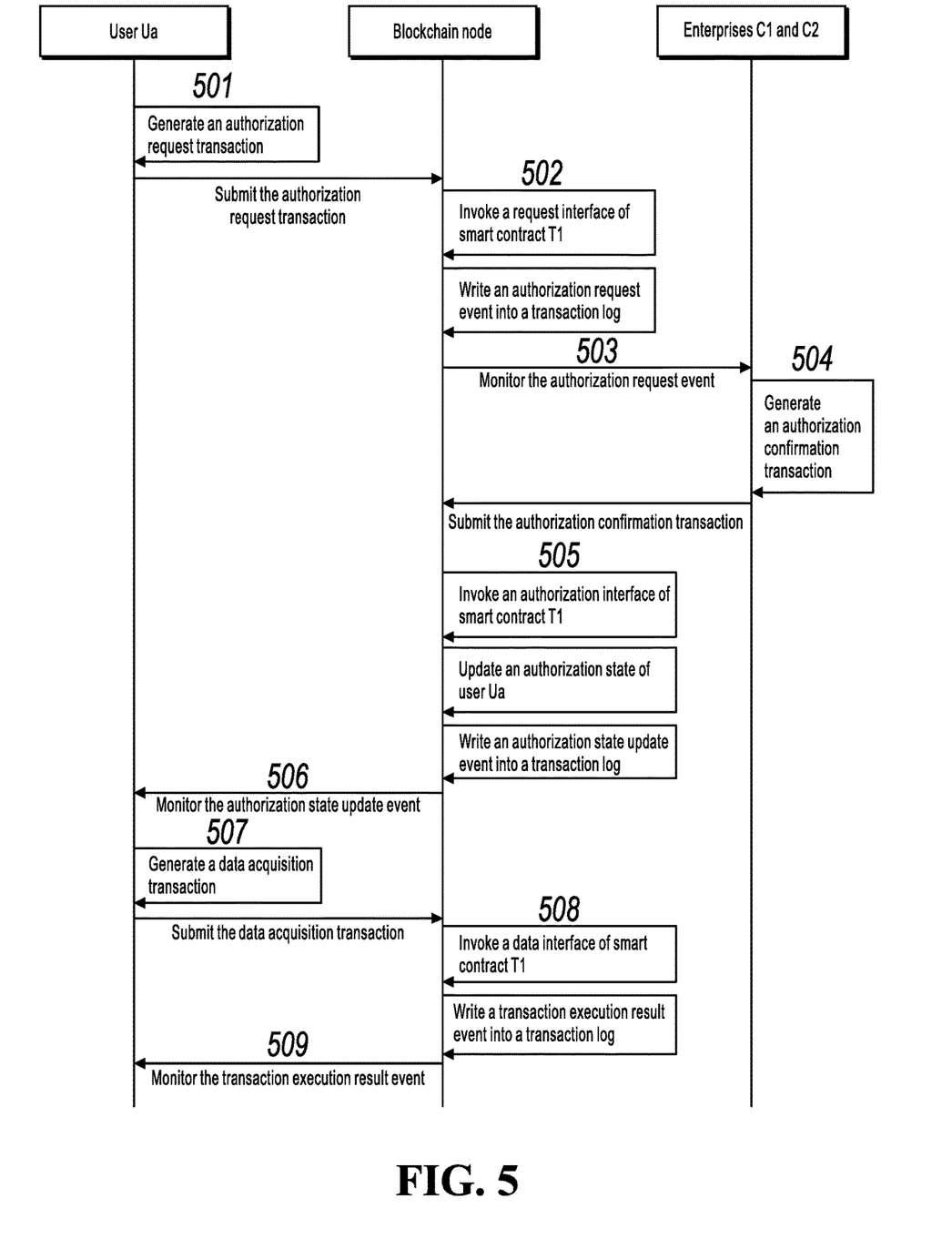
FIG. 5 is an interaction flowchart illustrating end-to-end data authorization implemented based on a blockchain network, according to an example implementation.

Assume that user Ua wants to know an average asset amount of supply chain financial enterprises C1 and C2 for related purposes. However, asset amounts are data that needs to be kept confidential for the enterprises C1 and C2, and cannot be separately provided by the enterprises C1 and C2 to user Ua, and therefore, user Ua cannot calculate the average asset amount. According to the technical solutions of the present specification, data privacy of the enterprises C1 and C2 is not exposed, and interests of a data user (e.g., user Ua) and a data owner (e.g., the enterprises C1 and C2) are protected while a data acquisition requirement of user Ua is satisfied. For example, FIG. 5 is an interaction flowchart illustrating end-to-end data authorization implemented based on a blockchain network, according to an example implementation. As shown in FIG. 5, an interaction procedure between user Ua, a blockchain node, and enterprises C1 and C2 can include the following steps:

Step 501: User Ua generates an authorization request transaction and submits the authorization request transaction to a blockchain network.

A computing device used by user Ua can run a client, generate the authorization request transaction based on the client, and submit the authorization request transaction to the blockchain network. Or, after generating the authorization request transaction on a client, user Ua can upload the authorization request transaction to a service platform 40, and the service platform 40 submits the authorization request transaction to the blockchain network. Or, user Ua can initiate an authorization request to a service platform 40, so that the service platform 40 generates the authorization request transaction and submits the authorization request transaction to the blockchain network.

The purpose of submitting the authorization request transaction to the blockchain network is to request the enterprises C1 and C2 to grant a related right to user Ua, so that user Ua can finally obtain the previously described average asset amount. The authorization request transaction can include data description information describing data that user Ua hopes to separately request authorization from the enterprises C1 and C2. For example, the data description information can separately describe an asset amount of enterprise C1 and an asset amount of enterprise C2. Accordingly, user Ua can be authorized for the asset amount of enterprise C1 and the asset amount of enterprise C2, but is unauthorized for other data. Or, the authorization request transaction may not include data description information, to indicate that user Ua hopes to separately request to obtain authorization for all data from the enterprises C1 and C2, so that user Ua is authorized for all data held by the enterprises C1 and C2, including the previously described asset amounts. The following describes subsequent steps by using an example that the authorization request transaction includes the data description information.

The authorization request transaction is originally submitted to a certain node in the blockchain network. For example, when the service platform 40 has a corresponding node N3 in the blockchain network, the authorization request transaction can be usually submitted to node N3 by the service platform 40, and certainly can also be submitted to other nodes. Similarly, the computing device used by user Ua can submit the authorization request transaction to a certain node. After the authorization request transaction is submitted to the blockchain network, a consensus can be made between nodes, and an agreed authorization request transaction can be executed on each node. POW, POS, DPOS, PBFT, or another consensus mechanism in a related technology can be used in the consensus process. Implementations are not limited in the present specification.

Step 502: The blockchain node assists, by invoking a request interface of smart contract T1, user Ua in obtaining data authorization, and writes an authorization request event into a transaction log.

After the consensus, each node in the blockchain network needs to execute the authorization request transaction. When executing the authorization request transaction, the blockchain node reads an account address filled in a TO field of the authorization request transaction, to invoke smart contract T1. Code of smart contract T1 can logically generate a plurality of interfaces to implement different functions, and the authorization request transaction can specifically specify an interface that needs to be invoked. For example, when the authorization request transaction invokes the request interface of smart contract T1, related authorization can be requested.

For example, the authorization request transaction can include the previously described data description information, information about user Ua (e.g., a signature of user Ua), information about the enterprises C1 and C2 (e.g., public keys of the enterprises C1 and C2), etc., so that after the request interface of smart contract T1 is invoked, the authorization request event can be written into the transaction log of the authorization request transaction. Content of the authorization request event can include the data description information, the information about user Ua, the information about the enterprises C1 and C2, etc., to indicate that user Ua hopes to obtain target data corresponding to the data description information from the enterprises C1 and C2.

Step 503: The enterprises C1 and C2 monitor the authorization request event.

Because operations of blockchain nodes are consistent, the enterprises C1 and C2 can access any corresponding blockchain node to learn the authorization request event based on an event monitoring responding mechanism, so as to determine the target data that user Ua hopes to obtain from the enterprises C1 and C2.

Step 504: The enterprises C1 and C2 separately generate authorization request transactions and submit the authorization request transactions to the blockchain network.

When allowing user Ua to obtain related target data, the enterprises C1 and C2 can separately generate and submit the authorization confirmation transactions, to indicate that the enterprises C1 and C2 agree to provide the target data such as the asset amounts to user Ua. Enterprise C1 is used as an example: The authorization confirmation transaction generated by enterprise C1 can include data description information corresponding to target data that enterprise C1 agrees to provide to user Ua, a public key of user Ua, a signature of enterprise C1, etc. Or, the authorization confirmation transaction can include information such as a transaction number of the authorization request transaction, to indicate that enterprise C1 agrees a related request of the authorization request transaction.

Step 505: The blockchain node invokes an authorization interface of smart contract T1, updates an authorization state of user Ua, and writes an authorization state update event into a transaction log.

As described above, smart contract T1 includes several predefined interfaces. In authorization confirmation transaction 1 submitted by enterprise C1 and authorization confirmation transaction 2 submitted by enterprise C2, TO fields can separately include a contract address of smart contract T1, and can specify a wish to invoke the authorization interface. Smart contract T1 can confirm, by running code corresponding to the authorization interface, that the enterprises C1 and C2 separately agree to grant a right to user Ua for the target data such as the asset amounts, so as to update the authorization state of user Ua to "authorized". As described above, the authorized state of user Ua can be recorded in a plurality of forms, which depends on a rule defined in smart contract T1. Details are omitted here for simplicity.

For the update of the authorization state of user Ua, smart contract T1 can write the corresponding authorization state update event into the transaction log to indicate that user Ua has obtained authorization for the asset amounts of the enterprises C1 and C2.

Step 506: User Ua monitors the authorization state update event.

Similar to step 503, user Ua can monitor, based on the event monitoring responding mechanism, the transaction log in the blockchain node that corresponds to the authorization confirmation transactions, and determine, based on the detected authorization state update event, that user Ua has obtained authorization for asset amounts of the enterprises C1 and C2.

Step 507: User Ua generates a data acquisition transaction and submits the data acquisition transaction to the blockchain network.

Similar to the authorization request transaction, user Ua can generate and submit the data acquisition transaction in a plurality of ways. For example, user Ua independently generates and submits the data acquisition transaction, user Ua independently generates the data acquisition transaction and then the service platform submits the data acquisition transaction, or the service platform generates and submits the data acquisition transaction. Details are omitted here for simplicity.

The data acquisition transaction can include data description information describing that user Ua hopes to obtain the average asset amount of the enterprises C1 and C2 (which can specifically include data description information of the asset amounts of the enterprises C1 and C2 and indicate that an operation rule used is averaging). Or, the data acquisition transaction can include the transaction number of the authorization request transaction or a transaction number of the authorization confirmation transaction, and can also indirectly indicate that user Ua hopes to obtain the average asset amount of the enterprises C1 and C2.

Step 508: The blockchain node invokes a data interface of smart contract T1, and writes a transaction execution result event into a transaction log.

The data interface of smart contract T1 is invoked to indicate, to smart contract T1, that user Ua hopes to obtain the average asset amount of the enterprises C1 and C2. Smart contract T1 can search for the authorization state of user Ua.

If user Ua is unauthorized, the transaction can be terminated. Or, smart contract T1 can write the authorization request event into the transaction log, to temporarily request authorization from the enterprises C1 and the enterprise C2 through a process similar to steps 502 to 505. In this case, the data acquisition transaction is equivalent to an authorization request function and a data acquisition function, and a related operation and step of the authorization request transaction can be omitted.

If user Ua has been authorized, smart contract T1 can obtain the asset amounts of the enterprises C1 and C2. For example, when values of the asset amounts are stored in the blockchain, for example, stored in the blockchain in ciphertext, smart contract T1 can read encrypted asset amounts and decrypt the asset amounts in the trusted execution environment at the blockchain node to obtain the asset amounts in plaintext. For another example, when values of the asset amounts are stored through channels off the blockchain separately maintained by the enterprises C1 and C2, smart contract T1 can obtain the values of the asset amounts by using a cross-chain technology. For example, smart contract T1 can invoke oracle smart contract T2, so that oracle smart contract T2 can separately read the asset amounts of the enterprises C1 and C2 from the channels off the blockchain, and return the asset amounts to smart contract T1.

After obtaining the asset amounts of the enterprises C1 and C2, smart contract T1 can calculate the corresponding average asset amount based on a predefined operation rule. For example, when the asset amount of enterprise C1 is m1 and the asset amount of enterprise C2 is m2, the average asset amount can be calculated as follows: $M=(m1+m2)/2$. Correspondingly, smart contract T1 can add the value of the average asset amount M to the transaction execution result event, and write the transaction execution result event into the transaction log of the data acquisition transaction.

Step 509: User Ua monitors the transaction execution result event.

As described above, user Ua can monitor the transaction log of the data acquisition transaction based on the event monitoring responding mechanism, to detect the transaction execution result event. If the data acquisition transaction is successfully implemented, user Ua can obtain the average asset amount M of the enterprises C1 and C2 from the transaction execution result event, so that a requirement of user Ua on the average asset amount can be satisfied, and leakage of the values of the asset amounts of the enterprises C1 and C2 can be alleviated.

Figure 6:
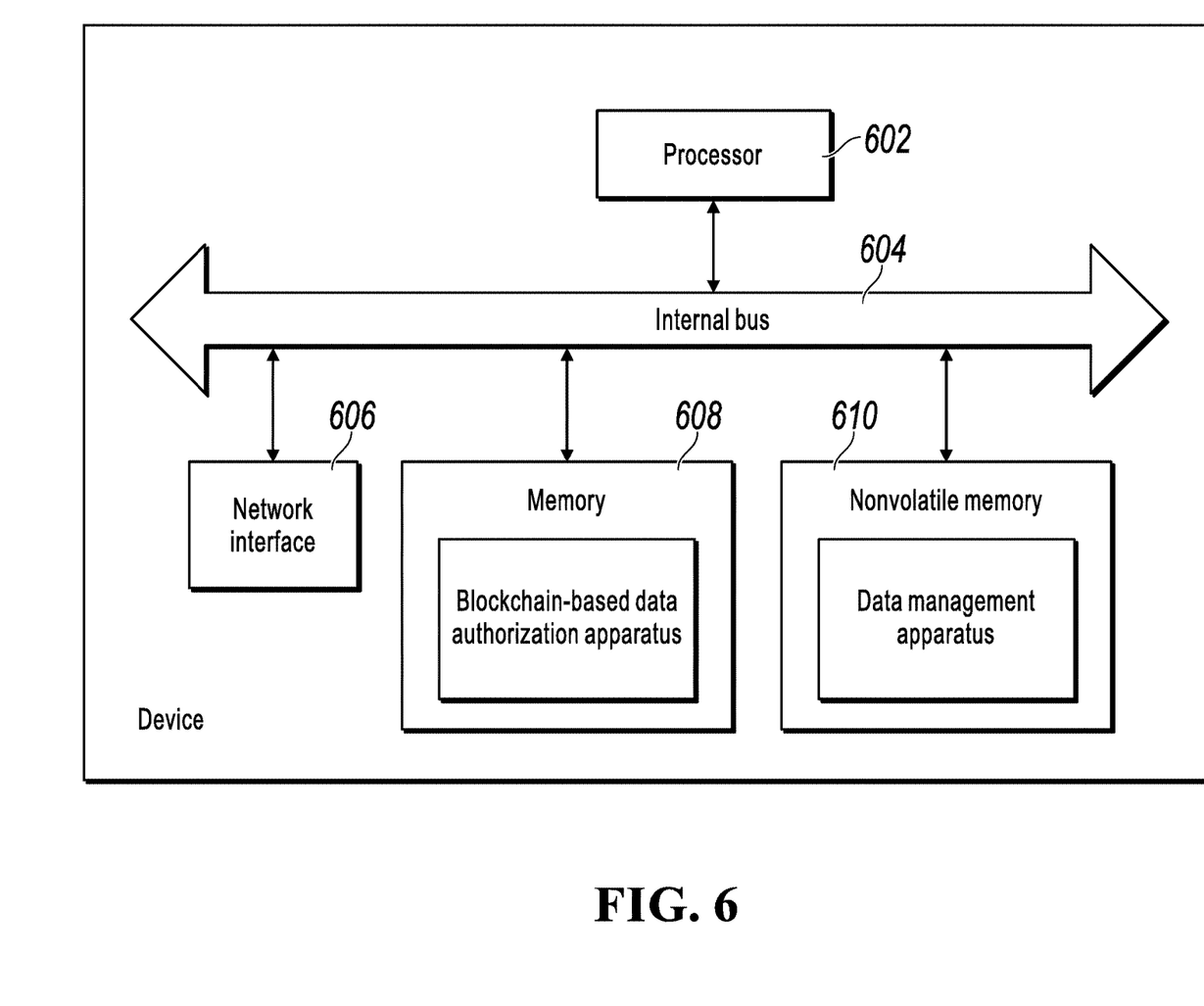
FIG. 6 is a schematic structural diagram illustrating a device, according to an example implementation.

FIG. 6 is a schematic structural diagram illustrating a device, according to an example implementation. As shown in FIG. 6, in terms of hardware, the device includes a processor 602, an internal bus 604, a network interface 606, a memory 608, and a non-volatile memory 610, and certainly can further include other hardware needed by services. The processor 602 reads a corresponding computer program from the non-volatile memory 610 into the memory 608 and then runs the corresponding computer program, so as to form a smart contract-based data authorization apparatus in terms of logic. Certainly, in addition to software implementation, one or more implementations of the present specification do not exclude other implementations, for example, a logical device or a combination of hardware and software. In other words, an execution body of the following processing procedure is not limited to each logical unit, and can also be hardware or a logical device.

Figure 7:
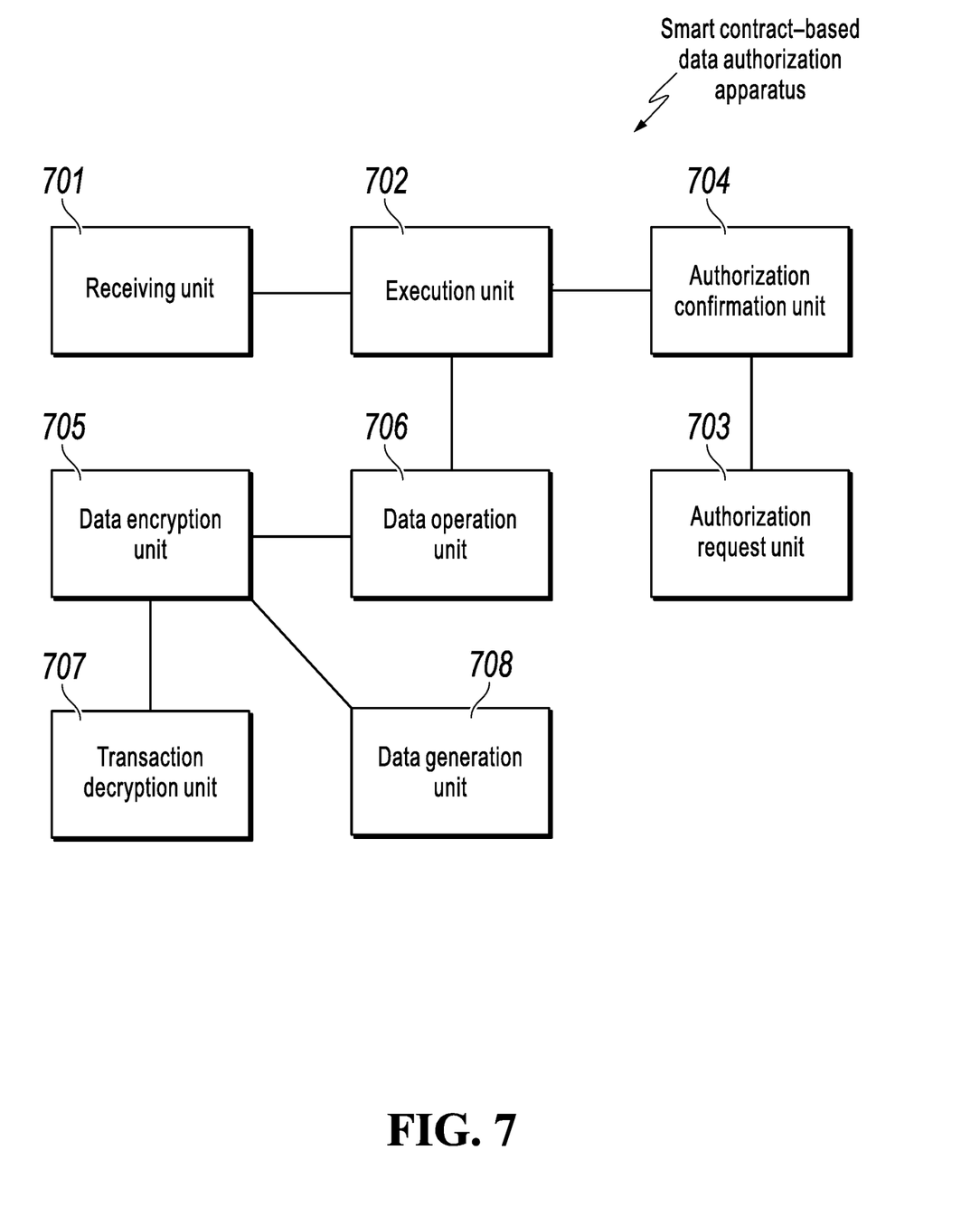
FIG. 7 is a block diagram illustrating a smart contract-based data authorization apparatus, according to an example implementation.

As shown in FIG. 7, in terms of software implementation, the smart contract-based data authorization apparatus can include the following: a receiving unit 701, configured to enable a blockchain node to receive a data acquisition transaction submitted by a data user, where the data acquisition transaction is used to request to obtain target data held by a data owner; and an execution unit 702, configured to enable the blockchain node to execute a data authorization smart contract invoked to perform the data acquisition transaction, where the data authorization smart contract is used to obtain the target data when it is confirmed that the data user is authorized, so that the data user obtains at least one of the target data and an operation result obtained after a predetermined operation is performed on the target data.

Optionally, the data authorization smart contract has a corresponding list of authorized parties, and it is confirmed that the data user is authorized when the data authorization smart contract confirms that the data user is in the list of authorized parties.

Optionally, the apparatus further includes the following: an authorization request unit 703, configured to enable the blockchain node to invoke a request interface defined in the data authorization smart contract based on an authorization request transaction submitted by the data user, so that the data authorization smart contract writes an authorization request event into a transaction log for monitoring by the data owner; and an authorization confirmation unit 704, configured to enable the blockchain node to invoke an authorization interface defined in the data authorization smart contract based on an authorization confirmation transaction submitted by the data owner, so that the data authorization smart contract marks the data user as authorized.

Optionally, when the target data is at a low privacy level, the target data is provided to the data user; or when the target data is at a high privacy level, the predetermined operation is performed on the target data, so that the corresponding operation result is provided to the data user.

Optionally, an operation rule of the predetermined operation is predefined in the data authorization smart contract; or an operation rule of the predetermined operation is transferred into the data authorization smart contract by the data acquisition transaction.

Optionally, at least one of the target data and the operation result is written into a transaction execution result event in a transaction log by the data authorization smart contract, so that the data user performs monitoring and acquisition.

Optionally, the apparatus further includes the following: a data encryption unit 705, configured to enable the blockchain node to encrypt the target data in a trusted execution environment to obtain encrypted target data, so that the encrypted target data is stored in a database corresponding to the blockchain node; and a data operation unit 706, configured to enable the blockchain node to execute the data authorization smart contract in the trusted execution environment, so that the data authorization smart contract performs the predetermined operation after the encrypted target data is read into the trusted execution environment and decrypted.

Optionally, the apparatus further includes the following: a transaction decryption unit 707, configured to enable the blockchain node to decrypt, after receiving a privacy certificate transaction submitted by the data owner, the privacy certificate transaction in the trusted execution environment to obtain the target data included in transaction content; or a data generation unit 708, configured to enable the blockchain node to execute, after receiving a certificate transaction submitted by the data owner, corresponding transaction content in the trusted execution environment to generate the target data.

Optionally, the blockchain node stores a digital digest of the target data, the target data is stored through a channel off the blockchain by the data owner, and the data authorization smart contract invokes an oracle smart contract, so that the oracle smart contract obtains the target data from the channel off the blockchain, and the data authorization smart contract performs the predetermined operation.

The system, apparatus, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A blockchain-based data authorization method, comprising:
    receiving, by a blockchain node, a data acquisition transaction submitted by a data user for obtaining target data possessed by a data owner;
    transmitting, by the blockchain node, the data acquisition transaction to a second blockchain node based on a blockchain consensus process;
    determining, by the blockchain node, that the data user has obtained authorization of the target data;
    executing, by the blockchain node, a smart contract invoked by the data acquisition transaction to provide one or more of the target data and a computational result of one or more predetermined computational operations performed based on the target data to the data user;
    providing, by the blockchain node and based at least on the blockchain node and the second blockchain node executing the smart contract, the target data and the computational result to the data user, wherein a transaction execution result event based on the target data and the computational result are written in a transaction log by the smart contract, and wherein the transaction log is monitored and available to be acquired by the data user;

encrypting, by the blockchain node, the target data in a trusted execution environment (TEE) to obtain encrypted target data; and storing, by the blockchain node, the encrypted target data to a database associated with the blockchain node;

wherein the executing the smart contract is performed in the TEE after reading the encrypted target data into the TEE and decrypting the encrypted target data, wherein the smart contract is executed to provide the target data to the data user if the target data has low data privacy level, and the smart contract is executed to provide the computational result of the one or more predetermined computational operations if the target data has high data privacy level.

2. The method according to claim 1, wherein the smart contract comprises a list of authorized users including the data user and the determining that the data user has obtained authorization of the target data is performed based on the list of authorized users.

3. The method according to claim 1, further comprising:

invoking, by the blockchain node, a request interface defined in the smart contract based on an authorization request transaction submitted by the data user to cause the smart contract to write an authorization request event into the transaction log of the data owner; and invoking, by the blockchain node, an authorization interface defined in the smart contract based on an authorization confirmation transaction submitted by the data owner to cause the smart contract to mark the data user as an authorized user.

4. The method according to claim 1, wherein one or more operation rules of the one or more predetermined computational operations are predefined in the smart contract or are transferred into the smart contract through the data acquisition transaction.

5. The method according to claim 1, wherein providing, by the blockchain node and based on, at least, the blockchain node and the second blockchain node executing the smart contract, the target data and the computational result to the data user comprises:

encrypting the target data and the computational result; and storing the encrypted target data and the encrypted computational result within the transaction execution result event in the transaction log, wherein the encrypted target data and the encrypted computational result are configured to enable the data user to decrypt the encrypted target data and the encrypted computational result to obtain the target data and the computational result.

6. The method according to claim 1, wherein the data acquisition transaction is a cyphertext of a privacy depository transaction, and executing the smart contract further comprises:

decrypting, by the blockchain node the cyphertext in the TEE to obtain the target data.

7. The method according to claim 1, wherein the blockchain node stores a digital digest of the target data, the target data is stored by the data owner in a storage media other than a blockchain, and is retrieved by another smart contract from the storage media and transferred to the smart contract to perform the one or more predetermined computational operations.

8. A computer-implemented system, comprising:

one or more computers, and one or more computer memory devices interoperably coupled with the one or more computers and having tangible, non-transitory, machine-readable media storing one or more instructions that, when executed by the one or more computers, perform operations comprising:

receiving, by a blockchain node, a data acquisition transaction submitted by a data user for obtaining target data possessed by a data owner;

transmitting, by the blockchain node, the data acquisition transaction to a second blockchain node based on a blockchain consensus process;

determining, by the blockchain node, that the data user has obtained authorization of the target data;

executing, by the blockchain node, a smart contract invoked by the data acquisition transaction to provide one or more of the target data and a computational result of one or more predetermined computational operations performed based on the target data to the data user;

providing, by the blockchain node and based at least on the blockchain node and the second blockchain node executing the smart contract, the target data and the computational result to the data user, wherein a transaction execution result event based on the target data and the computational result are written in a transaction log by the smart contract, and wherein the transaction log is monitored and available to be acquired by the data user;

encrypting, by the blockchain node, the target data in a trusted execution environment (TEE) to obtain encrypted target data; and storing, by the blockchain node, the encrypted target data to a database associated with the blockchain node;

wherein the executing the smart contract is performed in the TEE after reading the encrypted target data into the TEE and decrypting the encrypted target data, wherein the smart contract is executed to provide the target data to the data user if the target data has low data privacy level, and the smart contract is executed to provide the computational result of the one or more predetermined computational operations if the target data has high data privacy level.

9. The computer-implemented system according to claim 8, wherein the smart contract comprises a list of authorized users including the data user and the determining that the data user has obtained authorization of the target data is performed based on the list of authorized users.

10. The computer-implemented system according to claim 8, further comprising:

invoking, by the blockchain node, a request interface defined in the smart contract based on an authorization request transaction submitted by the data user to cause the smart contract to write an authorization request event into the transaction log of the data owner; and invoking, by the blockchain node, an authorization interface defined in the smart contract based on an authorization confirmation transaction submitted by the data owner to cause the smart contract to mark the data user as an authorized user.

11. The computer-implemented system according to claim 8, wherein one or more operation rules of the one or more predetermined computational operations are predefined in the smart contract or are transferred into the smart contract through the data acquisition transaction.

12. The computer-implemented system according to claim 8, wherein providing, by the blockchain node and based on, at least, the blockchain node and the second blockchain node executing the smart contract, the target data and the computational result to the data user comprises:

encrypting the target data and the computational result; and storing the encrypted target data and the encrypted computational result within the transaction execution result event in the transaction log, wherein the encrypted target data and the encrypted computational result are configured to enable the data user to decrypt the encrypted target data and the encrypted computational result to obtain the target data and the computational result.

13. The computer-implemented system according to claim 8, wherein the data acquisition transaction is a cyphertext of a privacy depository transaction, and executing the smart contract further comprises:

decrypting, by the blockchain node the cyphertext in the TEE to obtain the target data.

14. The computer-implemented system according to claim 8, wherein the blockchain node stores a digital digest of the target data, the target data is stored by the data owner in a storage media other than a blockchain, and is retrieved by another smart contract from the storage media and transferred to the smart contract to perform the one or more predetermined computational operations.

15. A non-transitory, computer-readable medium storing one or more instructions executable by a computer system to perform operations comprising:

receiving, by a blockchain node, a data acquisition transaction submitted by a data user for obtaining target data possessed by a data owner;

transmitting, by the blockchain node, the data acquisition transaction to a second blockchain node based on a blockchain consensus process;

determining, by the blockchain node, that the data user has obtained authorization of the target data;

executing, by the blockchain node, a smart contract invoked by the data acquisition transaction to provide one or more of the target data and a computational result of one or more predetermined computational operations performed based on the target data to the data user;

providing, by the blockchain node and based at least on the blockchain node and the second blockchain node executing the smart contract, the target data and the computational result to the data user, wherein a transaction execution result event based on the target data and the computational result are written in a transaction log by the smart contract, and wherein the transaction log is monitored and available to be acquired by the data user;

encrypting, by the blockchain node, the target data in a trusted execution environment (TEE) to obtain encrypted target data; and storing, by the blockchain node, the encrypted target data to a database associated with the blockchain node;

wherein the executing the smart contract is performed in the TEE after reading the encrypted target data into the TEE and decrypting the encrypted target data, wherein the smart contract is executed to provide the target data to the data user if the target data has low data privacy level, and the smart contract is executed to provide the computational result of the one or more predetermined computational operations if the target data has high data privacy level.

16. The non-transitory, computer-readable medium of claim 15, wherein the smart contract comprises a list of authorized users including the data user and the determining that the data user has obtained authorization of the target data is performed based on the list of authorized users.

\* \* \* \* \*